United States Patent [19]

Kashiwabara et al.

[11] Patent Number: 5,261,297
[45] Date of Patent: Nov. 16, 1993

[54] CONTROL SYSTEM FOR AUTOMOTIVE AUTOMATIC TRANSMISSION

[75] Inventors: Masuo Kashiwabara; Hideki Sekiguchi; Seiichi Ohtani; Hiromitsu Yamaura; Tomoyuki Hirose; Takafumi Fukumoto, all of Gumma, Japan

[73] Assignee: Japan Electronic Control Systems Co., Ltd., Isezaki, Japan

[21] Appl. No.: 958,773

[22] Filed: Oct. 9, 1992

[51] Int. Cl.$^5$ .............................................. F16H 61/02
[52] U.S. Cl. ........................................ 74/861; 74/866
[58] Field of Search ................................ 74/861, 866

[56] References Cited

U.S. PATENT DOCUMENTS

| | | | |
|---|---|---|---|
| 4,677,878 | 7/1987 | Yamamori et al. | 74/861 X |
| 4,843,916 | 7/1989 | Bouta | 74/861 X |
| 5,088,350 | 2/1992 | Kurihara et al. | 74/866 X |
| 5,767,169 | 12/1992 | Saito et al. | 74/866 X |

FOREIGN PATENT DOCUMENTS 59-98540 8/1981 Japan.
61-257332 11/1986 Japan.

*Primary Examiner*—Dirk Wright
*Attorney, Agent, or Firm*—Foley & Lardner

[57] ABSTRACT

A control system for automatic transmission is provided in a motor vehicle having an internal combustion engine and an automatic transmission associated with the engine. The engine is operable on a fuel which is a mixture of gasoline and alcohol. The control system comprises an alcohol sensor for sensing the alcohol concentration in the fuel; a first device for deriving an engine load parameter which represents the load applied to the engine; a second device for correcting the engine load parameter with reference to the alcohol concentration sensed by the alcohol sensor; and a third device for controlling a line pressure of the transmission in accordance with the corrected engine load parameter.

7 Claims, 3 Drawing Sheets

CONTROL SYSTEM FOR AUTOMOTIVE AUTOMATIC TRANSMISSION

BACKGROUND OF THE INVENTION

1. Field of the Invention

The present invention relates in general to control systems for an automotive automatic transmission, and more particularly to control systems of a type which controls the transmission in accordance with engine load parameters. More specifically, the present invention is concerned with a control system for an automatic transmission associated with an internal combustion engine which is operatble on a mixed fuel including gasoline and alcohol.

2. Description of the Prior Art

Hitherto, various types of control systems for an automotive automatic transmission have been proposed and put into practical use.

One of them is a type shown in Japanese Patent First Provisional Publication 61-257332. In this control system, a throttle valve angle and a vehicle speed, which can be typical parameters for representing the engine load, are used for making a gear change data map. Under running of the vehicle, an appropriate gear position is looked up from the data map and a suitable gear change is carried out providing the transmission with the appropriate gear position.

Some of the conventional control systems are of a type in which the line pressure (viz., the oil pressure produced by an oil pump) of the transmission is controlled in accordance with the throttle valve angle.

In general, as the parameters for the engine load, the amount of air fed to the engine is used in addition to the throttle valve angle and the vehicle speed.

Nowadays, as a substitute for gasoline, alcohol, such as methanol or the like, has been introduced as fuel for automotive engines as is discussed in, for example, Japanese Patent First Provisional Publication 56-98540. The engine disclosed by this publication can be operated on either gasoline, alcohol or mixture of them. That is, an alcohol sensor is used for detecting the alcohol concentration in fuel, and the amount of fuel fed to the engine is controlled or corrected in accordance with the detected alcohol concentration. However, if an engine of the type disclosed by 56-98540 publication and an automatic transmission of the type disclosed by 61-257332 publication are simply combined, the following undesired phenomena may occur.

As is seen from the graph of FIG. 4, the engine torque obtained under the same rotation speed is different between gasoline and alcohol. Thus, if the engine load parameters given by the engine of 56-98540 publication are simply used for controlling the transmission of 61-257332 publication, they fail to accurately control the transmission in accordance with the engine torque. That is, if the line pressure is controlled by the throttle valve angle, the intake air amount and the vehicle speed, which are parameters for representing the engine load, a concentration change of alcohol in fuel tends to cause a marked shift shock as well as a marked slippage of friction elements of the transmission, which deteriorate drivability of the vehicle as well as fuel consumption of the same.

SUMMARY OF THE INVENTION

It is therefore an object of the present invention to provide a control system for an automotive automatic transmission, which is free of the above-mentioned drawbacks.

According to the present invention, there is provided an automatic transmission control system for use in a motor vehicle having an internal combustion engine and an automatic transmission associated with the engine, the engine being operable on a fuel which is a mixture of gasoline and alcohol. The control system comprises an alcohol sensor for sensing the alcohol concentration in the fuel; first means for deriving an engine load parameter which represents the load applied to the engine; second means for correcting the engine load parameter with reference to the alcohol concentration sensed by the alcohol sensor; and third means for controlling a line pressure of the transmission in accordance with the corrected engine load parameter.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
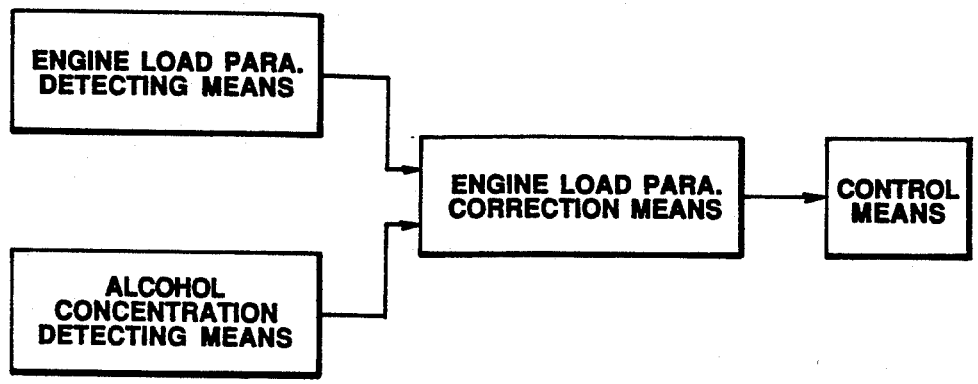
FIG. 1 is a block diagram showing the concept of the present invention.
Figure 2:
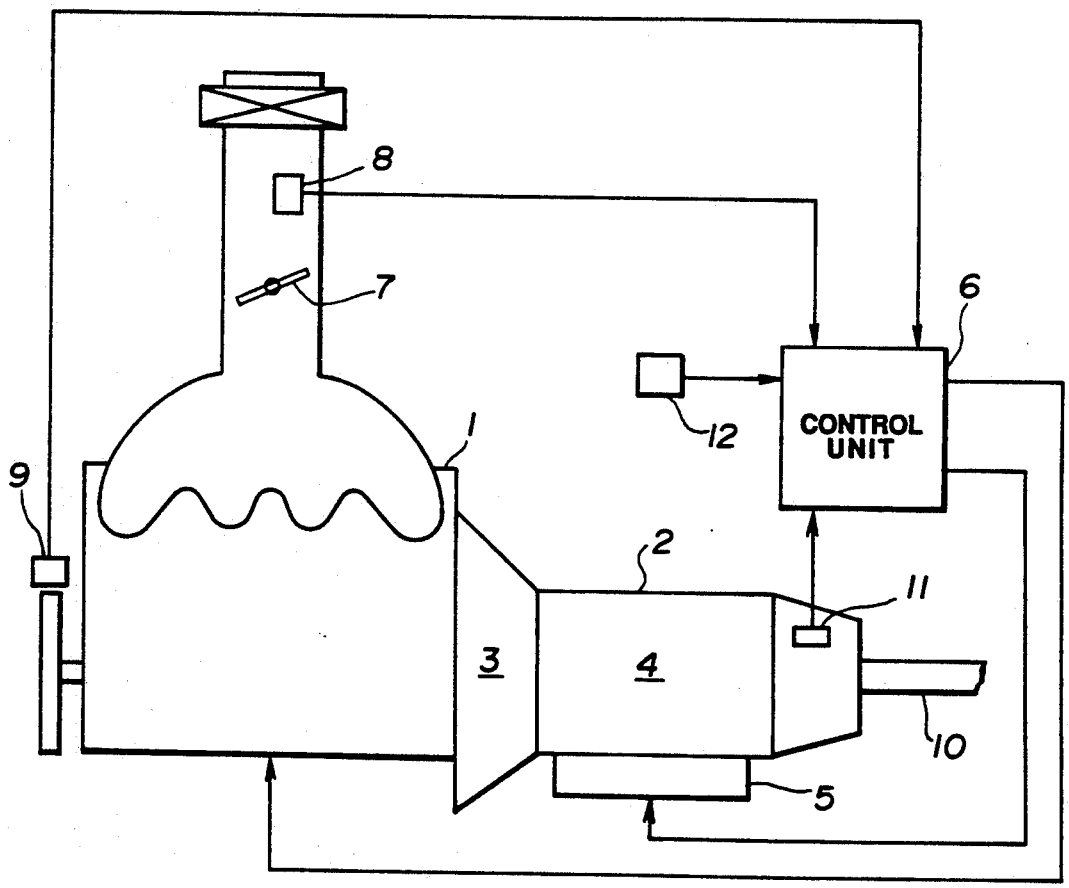
FIG. 2 is a schematic diagram showing the present invention.

Referring to FIG. 2, there is schematically shown a control system for an automatic transmission 2, according to the present invention. Designated by numeral 1 is an internal combustion engine to which the transmission 2 is connected. As is apparent as the description proceeds, the engine 1 can be operated on a fuel which is a mixture of gasoline and alcohol.

The transmission 2 comprises generally a torque converter 3 which converts the torque of the engine 1, a speed change mechanism 4 to which the converted torque is applied from the torque converter 3, hydraulically operated actuators (not shown) for actuating various friction elements of the speed change mechanism 4 and a hydraulic circuit 5 which controls the actuators in accordance with instructions applied thereto from a control unit 6.

The control unit 6 is constructed of a microcomputer, into which information signals from various sensors are fed through a suitable interface.

One of the sensors is a hot wire type air flow meter 8 located in an air intake passage of the engine 1 at a position upstream of a throttle valve 7. The air flow meter 8 detects the amount "Q" of air fed to the engine 1.

Designated by numeral 9 is a crankangle sensor which issues a reference pulse signal each time the engine crank passes a given angular position. By measuring the period of the reference pulse, an engine speed "N" is derived.

Designated by numeral 11 is a vehicle speed sensor which, by measuring the rotation speed of an output shaft 10 of the transmission 2, outputs a signal representing a vehicle speed "VSP".

Designated by numeral 12 is an alcohol sensor which senses the alcohol concentration in a mixed fuel, that is, a mixture of gasoline and alcohol. The alcohol sensor 12 may be of a capacitance type which practically uses the phenomenon in which the capacitance of the mixed fuel changes as the concentration of alcohol in the fuel changes. In accordance with the information signal issued from the alcohol sensor 12, the fuel amount fed to the engine 1 is electronically controlled.

As will be described in detail hereinafter, the information signal from the alcohol sensor 12 is also used for controlling the automatic transmission 2.

The computer of the control unit 6 includes a first CPU (viz., central processing unit) for controlling the engine 1 and a second CPU for controlling the transmission 2. The computer has a dual port random access memory "RAM" operatively connected to both the first and second CPUs. Thus, instruction data produced by both the CPUs can be commonly used for controlling both the engine 1 and the transmission 2.

The second CPU for the transmission 2 controls through the hydraulic circuit 5 the transmission 2 in such a manner that in "D(drive)-range", the transmission 2 is automatically shifted up or down to take first, second, third or fourth gear position in accordance with the information signals issued from the sensors 8, 9, 11 and 12 with reference to the memorized gear change data map.

As will be understood from the following, the second CPU for the transmission 2 controls also the line pressure of the transmission 2 in accordance with the engine torque.

Figure 3:
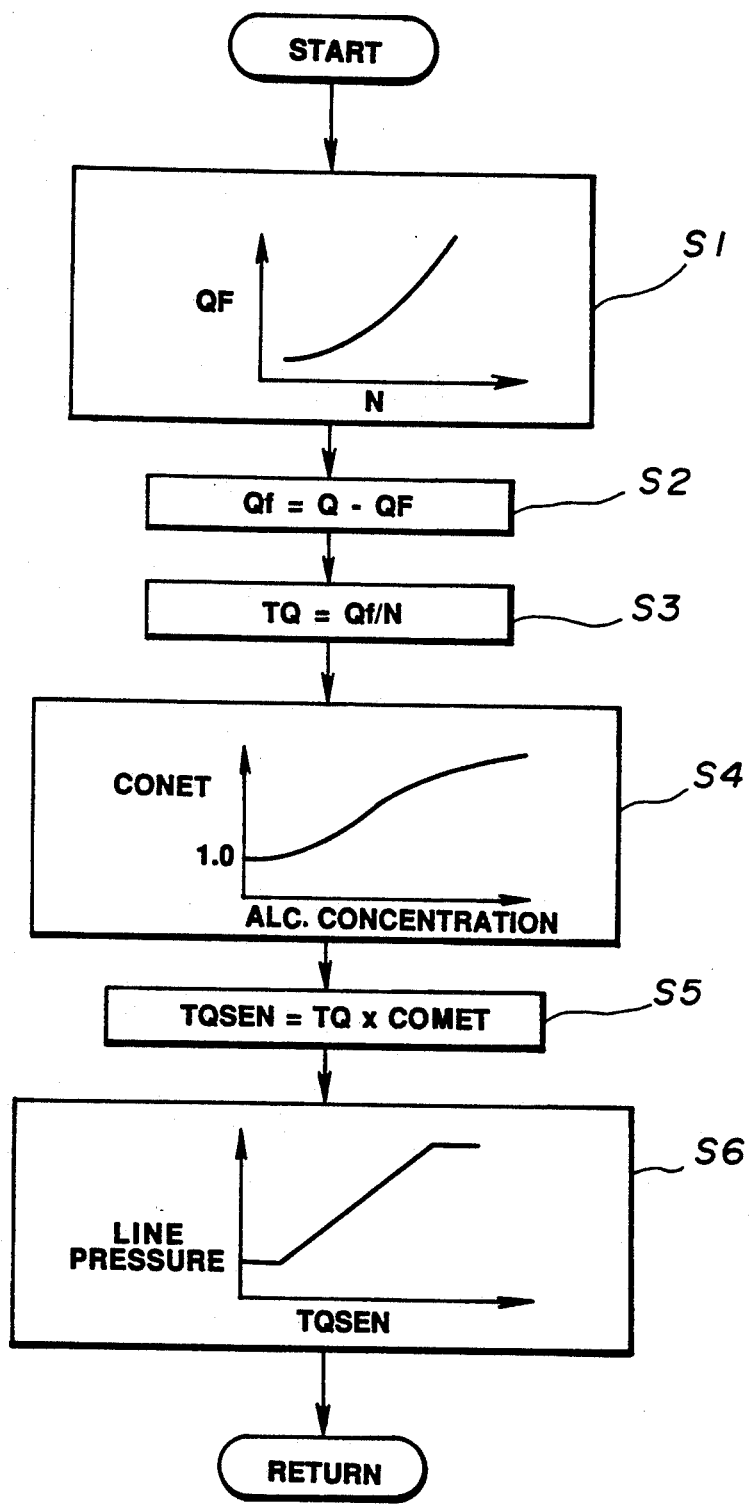
FIG. 3 is a flowchart showing the sequence of operation conducted in a control system of the present invention.

FIG. 3 is a flowchart showing operation steps conducted in the control unit 6 for achieving the line pressure control. At step 1 (viz., S1), an intake air amount "QF" corresponding to a friction loss of the engine 1 is looked up from a memorized data map which shows the relationship between the engine rotation speed "N" and the intake air amount "QF".

At step 2, the following subtraction is carried out to obtain a difference "Qf" which represents a corrected intake air amount.

$$Qf = Q - QF \qquad (1)$$

wherein:
Q: intake air amount detected by air flow meter 8.

At step 3, the following division is carried out to obtain a quotient "TQ".

$$TQ = Qf/N \qquad (2)$$

The quotient "TQ" is set as a parameter "TQ1" which represents the engine load.

At step 4, a correction factor "COMET" for correcting the engine load parameter "TQ1" is looked up from a given data map which shows the relationship between the alcohol concentration detected by the alcohol sensor 12 and the COMET".

Figure 4:
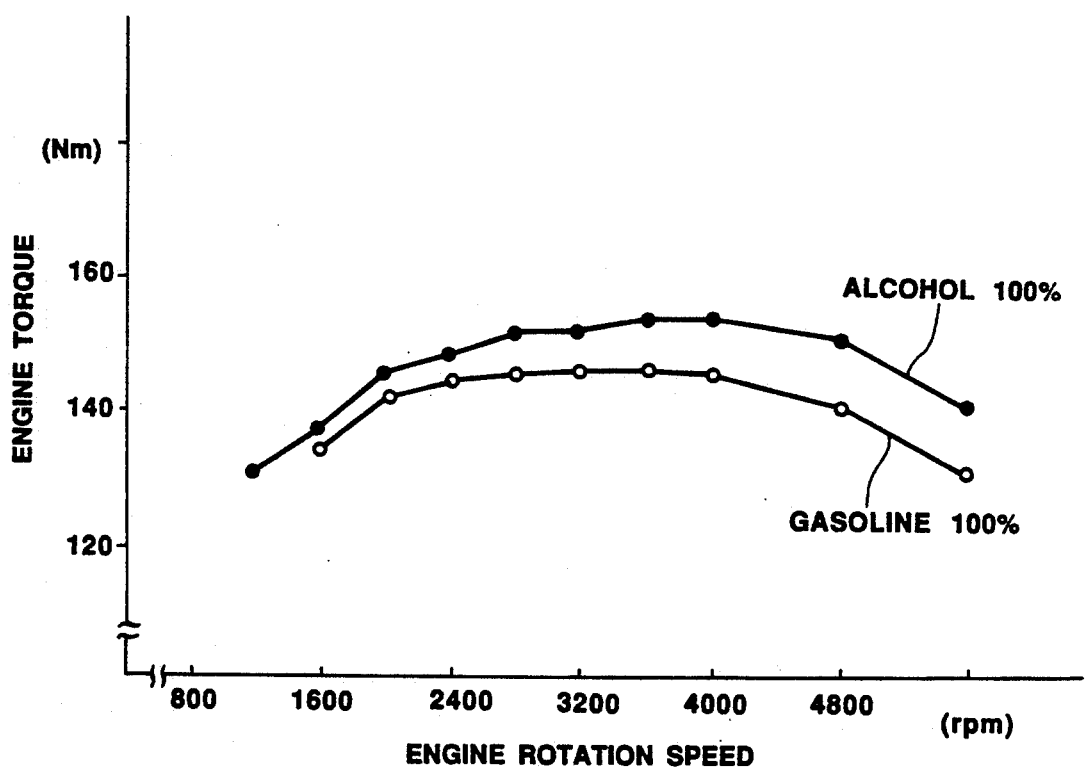
FIG. 4 is a graph showing torque characteristics of an internal combustion engine operated on gasoline and alcohol.

In the present invention, when the alcohol concentration is zero, that is, when the fuel contains only gasoline, the correction for the engine load parameter "TQ1" is not effected. That is, in such case, the correction factor "COMET" is set to 1.0, and as is seen from the data map of step 4, the correction factor "COMET" is gradually increased with increase of the alcohol concentration. This is because the engine torque given at the same intake air amount increases as the alcohol concentration in fuel increases. This will be understood from the graph of FIG. 4.

At step 5, the following multiplication is carried out to obtain a finally corrected parameter "TQSEN" which correctly represents the engine load.

$$TQSEN = TQ \times COMET \qquad (3)$$

Since the engine torque is forced to change when the alcohol concentration in fuel changes, the parameter "TQ1" can not accurately represent the engine torque. However, by correcting the parameter "TQ1" with the correction factor "COMET" using the equation of (3), the engine load is accurately represented by the "TQSEN".

At step 6, a target line pressure is looked up from a given data map which shows the relationship between the "TQSEN" and the target line pressure. In accordance with the target line pressure thus obtained, the control unit 6 controls the line pressure of the transmission 2 through the hydraulic circuit 5.

As is known to those skilled in the art, when the torque applied to the transmission 2 is increased, it is needed to increase the line pressure. In the present invention, this need is attained by the finally corrected parameter "TQSEN" which depends on the alcohol concentration in fuel. Thus, marked slippage of friction elements of the transmission and marked shift shock due to short line pressure are suppressed or at least minimized.

In the present invention, the following modifications are also possible.

If desired, the engine load parameter "TQSEN" may be used for determining a target gear position of the transmission. That is, in this modification, a gear change pattern data map is previously memorized by using both the above-mentioned corrected engine load parameter "TQSEN" and the vehicle speed "VSP" detected by the vehicle speed sensor 11, and the target shift position is looked up from this data map. Thus, in this modification, a desired shift position is obtained by the transmission in accordance with the engine torque which depends on the alcohol concentration in fuel.

Although, in the above-mentioned embodiment, the air flow meter 8 is used for obtaining the parameter "TQ", such parameter may be obtained by using a throttle valve angle sensor.

What is claimed is:

1. In a motor vehicle including an internal combustion engine and an automatic transmission associated with said engine, said engine being operable on a fuel which is a mixture of gasoline and alcohol,
a control system for controlling said automatic transmission, comprising:
an alcohol sensor for sensing the alcohol concentration in the fuel;
first means for deriving an engine load parameter which represents the load applied to said engine;
second means for correcting said engine load parameter with reference to the alcohol concentration sensed by said alcohol sensor; and
third means for controlling a line pressure of said transmission in accordance with the corrected engine load parameter.

2. A control system as claimed in claim 1, in which said first means comprises:

an air flow meter mounted located in an air intake passage of the engine for detecting the amount of air fed to the engine;

an engine rotation speed sensor for detecting the rotation speed of the engine; and means for deriving said engine load parameter by dividing the air amount detected by said air flow meter by the engine rotation speed detected by said engine rotation speed sensor.

3. A control system as claimed in claim 2, in which the air amount detected by said air flow meter is corrected with reference to a friction loss of said engine.

4. A control system as claimed in claim 3, in which said second means corrects said engine load parameter in such a manner that said parameter increases with increase of the alcohol concentration.

5. A control system as claimed in claim 4, in which said second means makes no correction to said engine load parameter when the alcohol concentration is zero.

6. A control system as claimed in claim 3, in which said second means corrects said engine load parameter by multiplying the engine load parameter by a correction factor which depends on said alcohol concentration.

7. A control system as claimed in claim 4, in which said third means controls said line pressure in such a manner that the line pressure is increased with increase of the corrected engine load parameter.

* * * * *